United States Patent
Baldwin et al.

(10) Patent No.: US 8,410,363 B1
(45) Date of Patent: Apr. 2, 2013

(54) TAMPER PROOF WALLPLATE

(75) Inventors: Jeffrey P. Baldwin, Phoenix, AZ (US);
Richard L. Cleghorn, Tempe, AZ (US);
Iven Dieterle, Tempe, AZ (US); Marcus J. Shotey, Scottsdale, AZ (US)

(73) Assignee: Hubbell Incorporated, Shelton, CT (US)

( * ) Notice: Subject to any disclaimer, the term of this patent is extended or adjusted under 35 U.S.C. 154(b) by 265 days.

(21) Appl. No.: 12/837,344

(22) Filed: Jul. 15, 2010

Related U.S. Application Data

(60) Provisional application No. 61/227,731, filed on Jul. 22, 2009.

(51) Int. Cl.
*H02G 3/14* (2006.01)

(52) U.S. Cl. ............. 174/67; 174/66; 439/135; 220/241

(58) Field of Classification Search .................... 174/66, 174/67; 220/241, 242; 439/135, 136
See application file for complete search history.

(56) References Cited

U.S. PATENT DOCUMENTS

| | | | |
|---|---|---|---|
| 2,988,242 A | 6/1961 | Kneip | |
| 4,302,624 A | 11/1981 | Newman | |
| 5,571,023 A * | 11/1996 | Anthony | 439/142 |
| 6,780,031 B1 | 8/2004 | Valls | |
| 7,265,292 B2 * | 9/2007 | Greenfield | 174/67 |

* cited by examiner

*Primary Examiner* — Dhirubhai R Patel
(74) *Attorney, Agent, or Firm* — Booth Udall Fuller, PLC

(57) ABSTRACT

An electrical wall plate including a wall having a front surface and a rear surface with at least one opening, the opening sized to receive a face of a receptacle, a hinge secured to the front surface, a cover pivotally mounted to the front surface proximate the hinge, a latch located on the cover releaseably engaging the cover and selectively preventing pivotal movement of the cover.

18 Claims, 3 Drawing Sheets

TAMPER PROOF WALLPLATE

CROSS REFERENCE TO RELATED APPLICATIONS

This Application claims the benefit of the filing date of U.S. Provisional Patent Application No. 61/227,731 to Baldwin et al. entitled "Tamper Proof Wall Plates" which was filed on Jul. 22, 2009, the disclosure of which is hereby incorporated herein by reference.

BACKGROUND OF THE INVENTION

1. Technical Field

Aspects and implementations of this document relate generally to wall plates. Particular implementations include wall plates that selectively prevent access to the electrical receptacle.

2. Background Art

Wall plates are well known in the electrical art aspects of construction and retail replacement by consumers. Conventionally, to cover the exposed wires and wiring attached to electrical devices or receptacles installed in electrical boxes, an electrical cover plate that includes openings that permit the exposed faces of the electrical device to be used are incorporated. The electrical cover plate, or wall plate, functions to prevent access to the electrically conductive wiring, but the receptacle face remains electrically conductive. Accordingly, children may still be able to harm themselves by inserting objects into the receptacle sockets.

A number of devices have been devised to reduce the risk of electrocution to curious children. One of the most popular is a simple plastic insert that is located within the receptacle sockets. However, children can peel the plastic insert out of the receptacle socket and risk electrocution. Other known devices utilize a mechanism to prevent removal of electrical outlet cords inserted in to the receptacle without manipulation of the wall plate.

SUMMARY

This disclosure includes electrical wall plates with safety mechanisms to prevent unauthorized access to the electrical receptacles. A particular implementation employs an electrical wall plate with a cover that is pivotally mounted to a wall and a latch prevents pivotal movement of the cover.

A particular embodiment broadly comprises an electrical wall plate including a wall having a front surface and a rear surface with at least one opening, the opening sized to receive a face of a receptacle, a hinge secured to the front surface, a cover pivotally mounted to the front surface proximate the hinge, at least one locking aperture extending through a planar surface of the wall immediately adjacent to the at least one opening, a latch located on the cover releaseably engaging the wall and selectively preventing pivotal movement of the cover.

In particular implementations, the latch may automatically prevent pivotal movement of the cover upon rotation to a latched position. The latch may further comprise a release mechanism operatively disengaging a first end of the cover from the wall. The release mechanism may be a pair of release mechanisms operatively connected to a pair of locking tabs. Both of the pair of release mechanisms may be depressed to move the pair of locking tabs completely within an aperture and permit pivotal movement of the cover. Each of the pair of locking tabs may be aligned collinear and arranged 180 degrees apart from each other. The release mechanism may include a pair of release mechanisms operatively connected to a pair of locking tabs and the at least one opening is two openings each sized to receive a face of a receptacle, each locking tab of the pair of locking tabs being associated with a different one of the two openings, wherein the at least one locking aperture comprises at least two apertures positioned through the wall between the two openings.

In additional particular implementations, a spring may bias the cover in the latched position. The hinge may be secured to a top portion of the front surface. The hinge may be secured to a side portion of the front surface. The latch may be disposed at least partially within the cover to prevent rotational movement of the cover when the cover is in the latched position.

Another particular embodiment broadly comprises an electrical wall plate comprising a wall having a front surface and a rear surface with first and second openings, each of the openings sized to receive a receptacle face, a first hinge and a second hinge on the front face, a first cover pivotally mounted to the front surface at the first hinge such that it pivotally hinges open upward, a second cover pivotally mounted to the front surface at the second hinge such that it pivotally hinges open downward, and a latch located on each of the first and second covers releasably engaging the wall and selectively preventing pivotal movement of the respective cover.

In particular implementations, the wall may also include a top portion and a bottom portion, wherein the first hinge is located proximate the top portion and the second hinge is located proximate the bottom portion. The first cover and the second cover may be located adjacent each other in a latched position. The latches may automatically prevent pivotal movement of the cover upon rotation to a latched position. Each of the latches may further include a release mechanism operatively connected to a locking tab. The wall may further comprise at least one locking aperture extending through the wall between the first and second openings, wherein the latch located on each of the first and second covers is aligned with one of the at least one latch apertures.

In further particular implementations, the release mechanism may be a pair of release mechanisms operatively connected to a pair of locking tabs. Both of the pair of release mechanisms for each latch may be required to be manipulated to permit pivotal movement of the cover. The first cover may be pivotable independent of the second cover. The first cover may pivot in a first direction and the second cover may pivot in a second direction opposite the first direction. A spring may bias the first cover in a latched position and a second spring may bias the second cover in a latched position.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspect, features, and advantages will be apparent to those artisans of ordinary skill in the art from the DETAILED DESCRIPTION, BRIEF DESCRIPTION OF THE DRAWINGS, and from the CLAIMS.

BRIEF DESCRIPTION OF THE DRAWINGS

Features of particular embodiments and implementations of light fixtures will hereinafter be described in conjunction with the appended drawings, where like designations denote like elements, and.

DETAILED DESCRIPTION

At the outset, it should be appreciated that like drawing numbers on different views identify identical, or functionally similar, structural elements. While the present implementations may be described with respect to what is presently considered to be the preferred embodiments, it is to be understood that the claims are not limited to the disclosed aspects.

This disclosure, its aspects and implementations, are not limited to the specific components or assembly procedures disclosed herein. Many additional components and assembly procedures known in the art consistent with the intended wall plates and/or assembly procedures for wall plates may be used and will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such wall plates and implementing components, consistent with the intended operation and purpose of wall plates. As used herein, "wall plate" is intended to specifically refer to the plate used to surround a electrical receptacle or switch and hide the wiring and electrical box.

Figure 1:
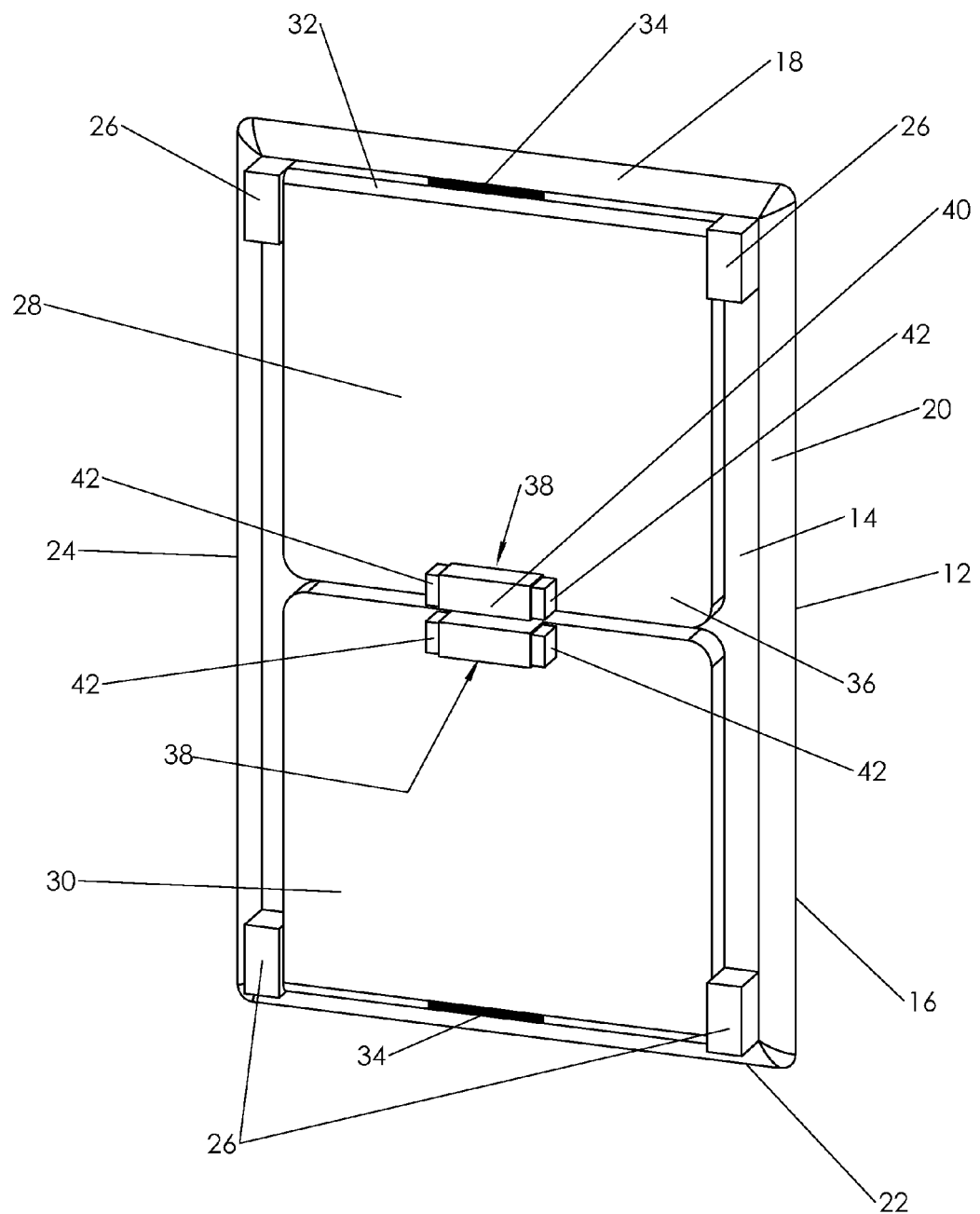
FIG. 1 is a front perspective view of a wall plate with first and second covers in the latched position.

Accordingly, there are a variety of tamper proof wall plates. FIG. 1 illustrates a wall plate 10 with a body 12 having a front surface 14 and a rear surface 16. Body 12 includes a top side 18, a right side 20, a bottom side 22, and a left side 24 for a generally rectangular shape in one particular embodiment. A pair of hinges 26 are each located on front surface 14 along top side 18 and bottom side 22, although the hinges may also be located along right side 20 and left side 24 if desired. A first cover 28 may be secured at hinges 26 along top side 18, while a second cover 30 may be located proximate bottom side 22. Both first cover 28 and second cover 30 are arranged to pivot about hinges 26 independent of one another.

First cover 28 includes a first end 32 proximate top side 18 with a spring mechanism 34 disposed therein or within hinges 26 to bias the cover in a closed position as seen in FIG. 1. Second cover 30 is arranged similar to the first cover except that the second cover is pivotable about an end of the cover 30 proximate bottom side 22 in a particular embodiment. Nevertheless, first end 32 may be located along both right side 20 or left side 24 and achieve the same results.

First cover 28 also includes a second end 36 opposite first end 32 and is arranged proximate a second end of second cover 30. Each second end 36 has a latch 38 with a base 40 and a pair of release mechanisms 42 extending outward in opposite directions from one another. Specifically, release mechanisms 42 may be aligned collinear and 180 degrees apart from each other. First cover 28 and second cover 30 are each arranged to automatically close the cover in a latched position due to the biasing action of spring 34 and the retention of latch 38.

Specifically, latches 38 engage wall plate 10 when in the closed position and will not permit pivotal movement of first cover 28 until at least one of release mechanisms 42 is depressed. In a particular embodiment, both release mechanisms 42 must be depressed in order to permit pivotal movement. The dual depression may be simultaneous or at different times before pivotal movement is achieved, depending on the particular wall plate and cover design. The operation and function of second cover 30 with latch 38 and release mechanisms 42 is identical to the first cover.

Figure 2:
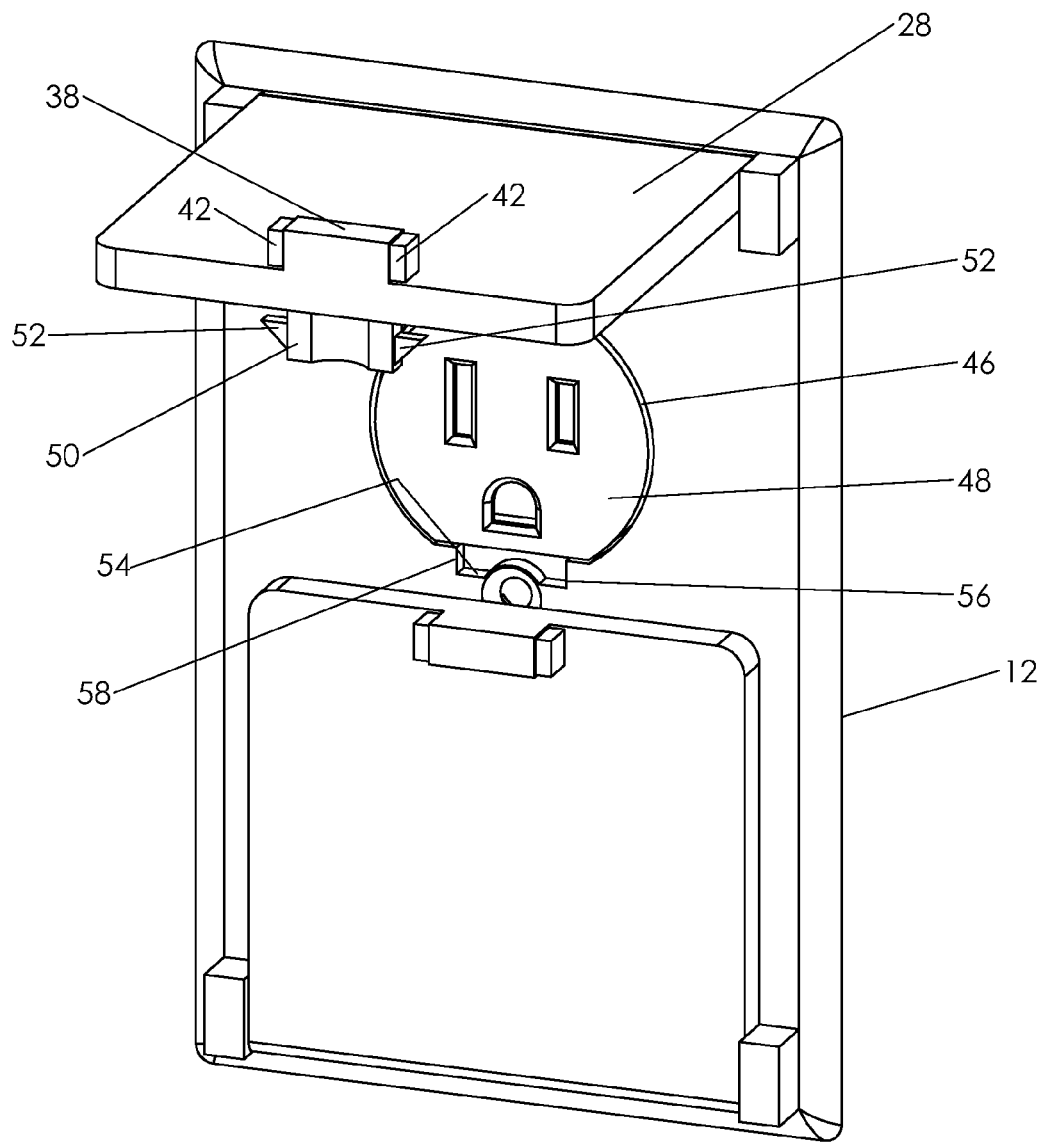
FIG. 2 is a front perspective view of the wall plate with the first cover in the open position; and, FIG. 3 is a rear perspective view of the wall plate with the first cover in the open position and the second cover in the latched position.

Referring now to FIG. 2, a user has depressed both release mechanisms 42 to disconnect latch 38 from body 12 and permit pivotal movement of cover 28. Thus, front surface 14 and rear surface 16 include a first opening 46 for receiving a receptacle face 48, while a second opening (not shown in FIG. 2) also receives a second receptacle face for a duplex receptacle. Thus, pivoting cover 28 permits access to the receptacle face 48 when an adult operates the release mechanisms 42 and rotates the cover. Similarly, second cover 30 is pivotable in a direction opposite to permit access to a second receptacle face.

Latch 38 may include a locking mechanism housing 50 with locking tabs 52 corresponding to release mechanisms 42. Advantageously, compressing release mechanisms 42 retracts each respective locking tab 52. Further, body 12 includes a locking aperture 54 having a first locking wall 56 and a second locking wall 58. Locking walls 56 and 58 permit each locking tab 52 to operate independently of the other locking tab. Accordingly, covers 28 and 30 can only be pivoted to an open position if both release mechanisms and locking tabs are moved inward into latch 38 and housing 50 so that locking tabs 52 are completely within locking aperture 54. While locking aperture 54 is shown and described as extending through the entire thickness of body 12, the aperture may extend only partially through body 12.

Figure 3:
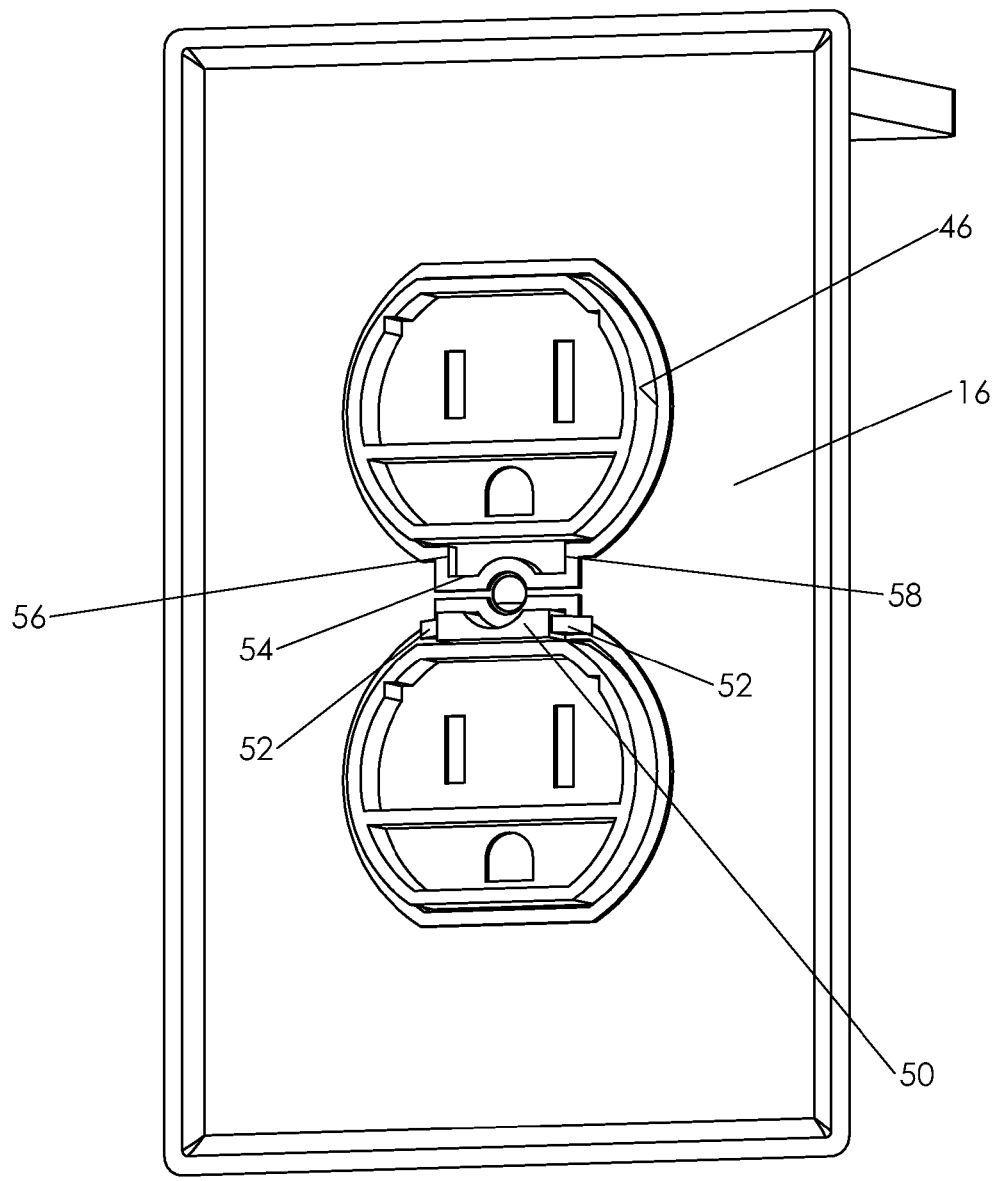

FIG. 3 illustrates the back side of wall plate 10 with cover 28 pivoted to the open position and aperture 54 open. Cover 30 is illustrated in the latched position with locking mechanism housing 50 and locking tabs 52 extending through the aperture.

Advantageously, wall plate 10 can easily prevent unauthorized access to a receptacle face while permitting access to the receptacle by a user with sufficient dexterity to depress the release mechanisms and pivot or rotate the cover. Thus, the receptacle face is not accessible by children, but is accessible by adults.

The concepts disclosed herein are not limited to the specific implementations shown herein. For example, implementations of light fixtures, and implementing components, may be formed of any of many different types of materials or combinations thereof that can readily be formed into shaped objects provided that the materials selected are consistent with the intended operation of wall plate implementations. For example, the components may be formed of: polymers such as thermoplastics (such as ABS, Fluoropolymers, Polyacetal, Polyamide; Polycarbonate, Polyethylene, Polypropylene (low or high density), Polysulfone, and/or the like), thermosets (such as Epoxy, Phenolic Resin, Polyimide, Polyurethane, Silicone, and/or the like), any combination thereof, and/or other like materials; composites and/or other like materials; metals and/or other like materials; alloys and/or other like materials; any other suitable material; and/or any combination of the foregoing thereof. Also, appropriate mounting fasteners, hardware and components may be provided. Those of ordinary skill in the art will readily be able to select appropriate materials and manufacture these products from the disclosures provided herein.

Furthermore, the wall plate and any other components forming any particular implementation of a wall plate may be manufactured simultaneously or separately and integrally joined with one another, while other components may be pre-manufactured or manufactured separately and then assembled with the integral components. Various implementations may be manufactured using conventional procedures as added to and improved upon through the principles described here. Accordingly, manufacture of these components separately or simultaneously may involve extrusion, vacuum forming, injection molding, blow molding, casting, forging, cold rolling, milling, drilling, reaming, turning, grinding, stamping, pressing, cutting, bending, welding, soldering, hardening, riveting, punching, and/or the like. Components manufactured separately may then be coupled or removably coupled with the other integral components, if necessary, in any manner, such as with adhesive, a weld joint, a solder joint, a fastener (e.g. a bolt, a bolt and a nut, a screw, a rivet, a pin, and/or the like), washers, retainers, any combination thereof, and/or the like for example, depending on, among other considerations, the particular material forming the components. Other possible steps might include sand blasting, polishing, powder coating, zinc plating, anodizing, hard anodizing, and/or painting the components for example.

The invention claimed is:

1. An electrical wall plate comprising:
a body comprising a front surface and a rear surface with at least one opening, the at least one opening sized to receive a face of a receptacle;
at least one cover hingedly coupled to the front surface of the body and pivotable between a closed position that covers the at least one opening and an open position the uncovers the at least one opening;
a latch coupled to the at least one cover, the latch comprising opposing release mechanisms and one or more locking tabs that retract in response to compression of the opposing release mechanisms; and
at least one locking aperture extending through the body and positioned to engage with the one or more locking tabs when the at least one cover is in the closed position to prevent the at least one cover from pivoting to the open position unless the opposing release mechanisms are compressed to retract the one or more locking tabs.

2. The electrical wall plate of claim 1 wherein the latch automatically prevents pivotal movement of the cover upon rotation to the closed position.

3. The electrical wall plate of claim 1, wherein the at least one opening comprises a first opening and a second opening, the at least one cover comprises a first cover hingedly coupled to the front surface to cover the first opening and a second cover hingedly coupled to the front surface to cover the second opening, and the at least one locking aperture comprises a first locking aperture positioned to engage with the one or more locking tabs of the first cover and a second locking aperture positioned to engage with the one or more locking tabs of the second locking aperture.

4. The electrical wall plate of claim 3, wherein the first cover is hingedly coupled to the front surface proximate a top side of the body and the second cover is hingedly coupled to the front surface proximate a bottom side of the body.

5. The electrical wall plate of claim 1, wherein both of the release mechanisms are depressed to retract the one or more locking tabs to permit pivotal movement of the cover from the closed position to the open position.

6. The electrical wall plate of claim 1, wherein the one or more locking tabs comprise two locking tabs are aligned collinear and arranged 180 degrees apart from each other.

7. The electrical wall plate of claim 1 further comprising a spring biasing the cover in the closed position.

8. The electrical wall plate of claim 1 wherein both the first cover and the second cover are hingedly coupled to the front surface proximate the right side or the left side.

9. The electrical wall plate of claim 1 wherein the latch is disposed at least partially within the cover to prevent rotational movement of the cover when the cover is in the closed position.

10. An electrical wall plate comprising:
a body comprising a front surface and a rear surface with first and second openings, each of the opening sized to receive a receptacle face;
a first cover hingedly coupled to the front surface of the body and pivotable between a closed position that covers the first opening and an open position that uncovers the first opening;
a second cover hingedly coupled to the front surface of the body and pivotable between a closed position that covers the second opening and an open position that uncovers the second opening; and
two latches, each latch coupled to a different cover of the first and second covers and each comprising opposing release mechanisms and one or more locking tabs, the one or more locking tabs configured to retract in response to compression of the opposing release mechanisms and engage with the body when the first and second covers are in the closed position and the release mechanisms are not compressed.

11. The electrical wall plate of claim 10 wherein the wall further comprises a top side and a bottom side, wherein the first cover is hingedly coupled to the front surface proximate the top side and the second cover is hingedly coupled to the front surface proximate the bottom portion.

12. The electrical wall plate of claim 11 further comprising at least one locking aperture extending through the wall between the first and second openings, wherein the one or more locking tabs engage with the at least one locking aperture when the first and second covers are in the closed position and the release mechanisms are not compressed.

13. The electrical wall plate of claim 12, wherein both of the release mechanisms for each latch must be compressed to permit pivotal movement of the respective cover from the closed position to the open position.

14. The electrical wall plate of claim 10 wherein the latches automatically prevent pivotal movement of the cover upon rotation to the closed position.

15. The electrical wall plate of claim 10 wherein the first cover is pivotable independent of the second cover.

16. The electrical wall plate of claim 15 wherein the first cover pivots in a first direction and the second cover pivots in a second direction opposite the first direction.

17. The electrical wall plate of claim 10 further comprising a first spring biasing the first cover in the closed position and a second spring biasing the second cover in the closed position.

18. An electrical wall plate, comprising:
- a body comprising at least one opening sized to receive a face of a receptacle;
- at least one cover hingedly coupled to body and pivotable between a closed position that covers the at least one and an open position that uncovers the at least one opening;
- a latch coupled to the at least one cover, the latch comprising opposing release mechanisms on a first side of the at least one cover and one or more locking tabs on a second side of the at least one cover opposite the first side, the one or more locking tabs responsive to compression of the opposing release mechanisms to move to a retracted position;
- at least one locking aperture extending through the body and positioned to engage with the one or more locking tabs when the at least one cover is in the closed position and the opposing release mechanisms are not compressed to prevent pivoting of the at least one cover from the closed position to the open position.

* * * * *